Figure 1:
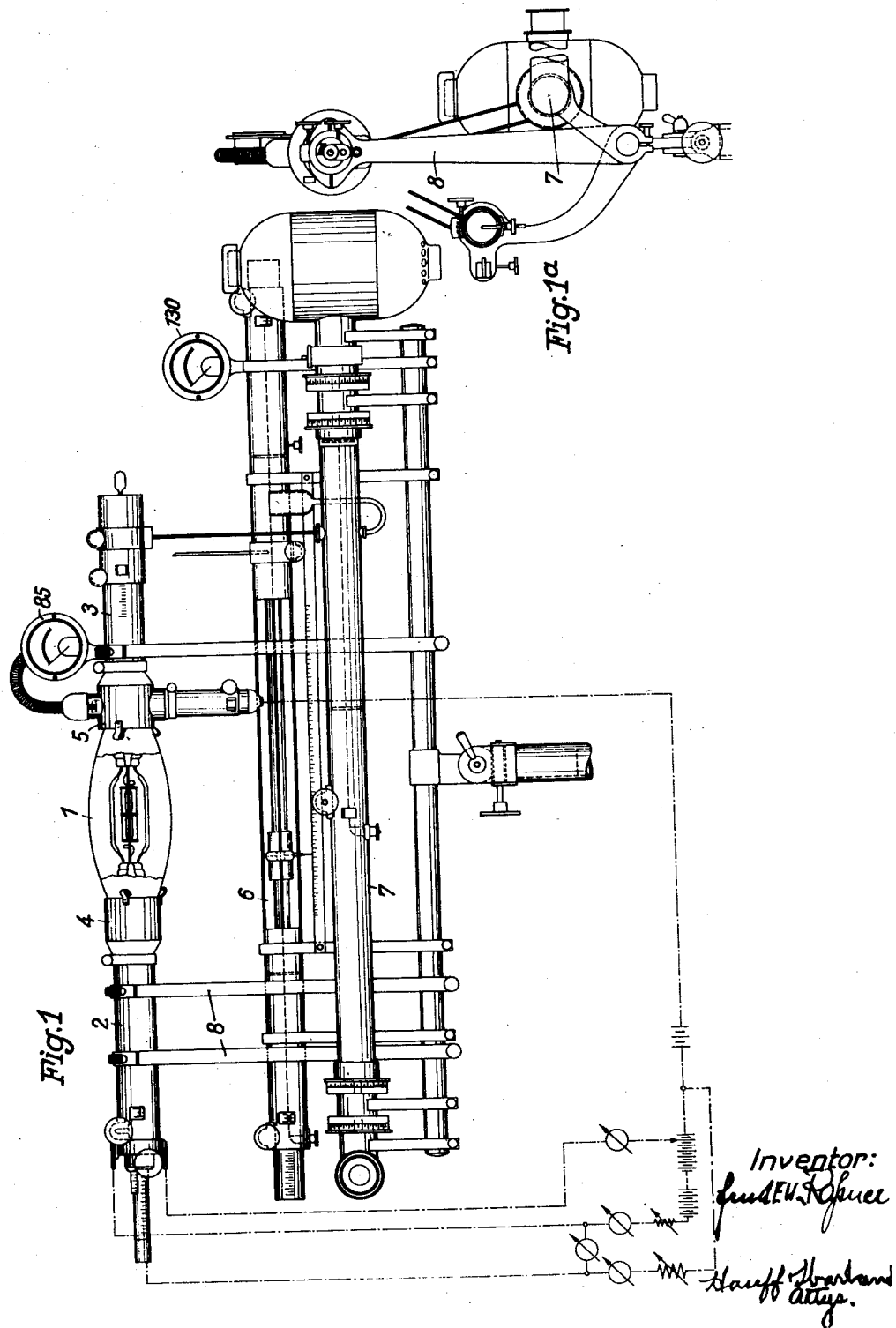

March 1, 1938.  E. E. W. KASSNER  2,109,843
APPARATUS FOR GENERATING AND APPLYING ULTRASHORT ELECTROMAGNETIC WAVES
Filed Sept. 15, 1934   11 Sheets-Sheet 2

March 1, 1938.  E. E. W. KASSNER  2,109,843
APPARATUS FOR GENERATING AND APPLYING ULTRASHORT ELECTROMAGNETIC WAVES
Filed Sept. 15, 1934  11 Sheets-Sheet 3
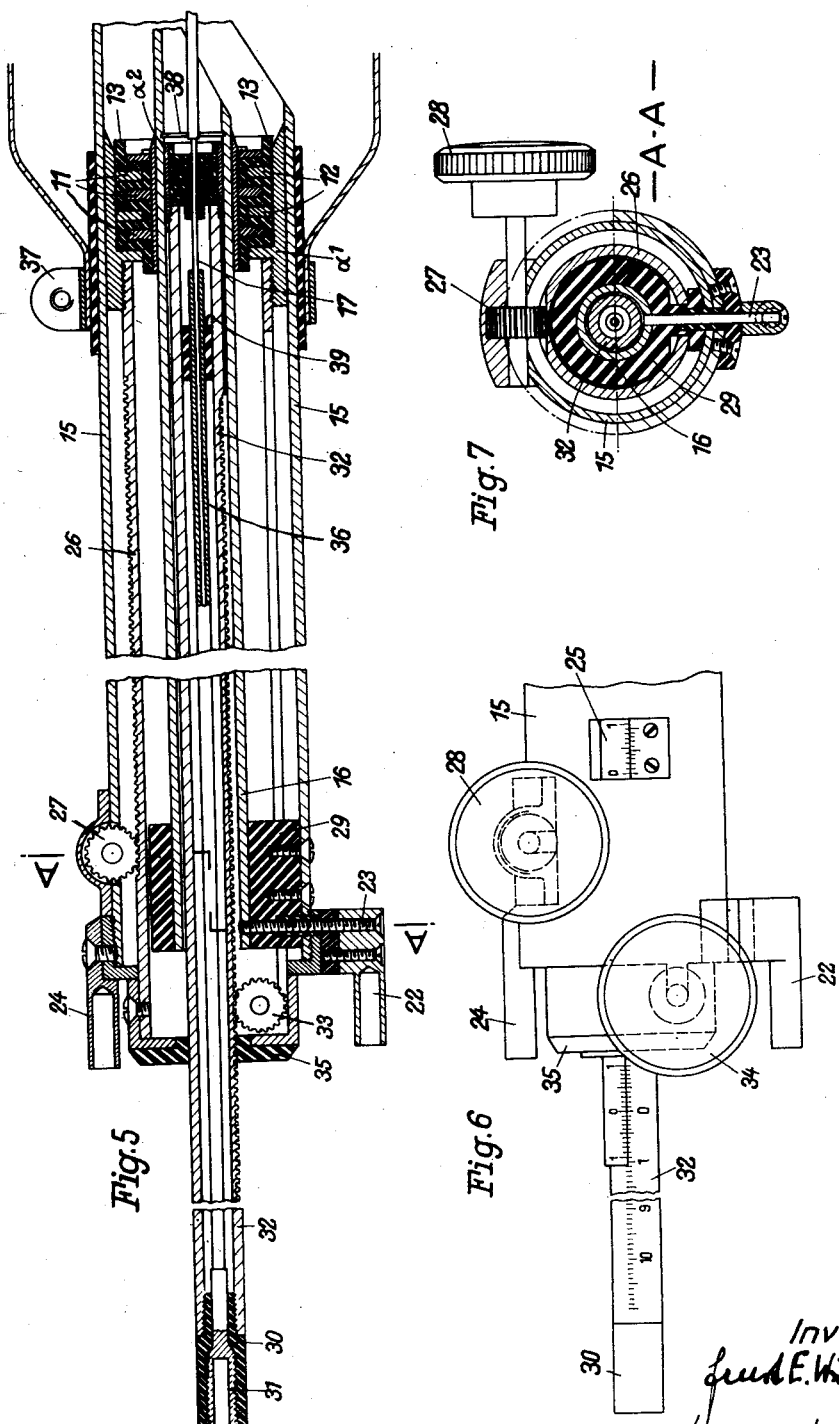

March 1, 1938. E. E. W. KASSNER 2,109,843
APPARATUS FOR GENERATING AND APPLYING ULTRASHORT ELECTROMAGNETIC WAVES
Filed Sept. 15, 1934 11 Sheets-Sheet 4
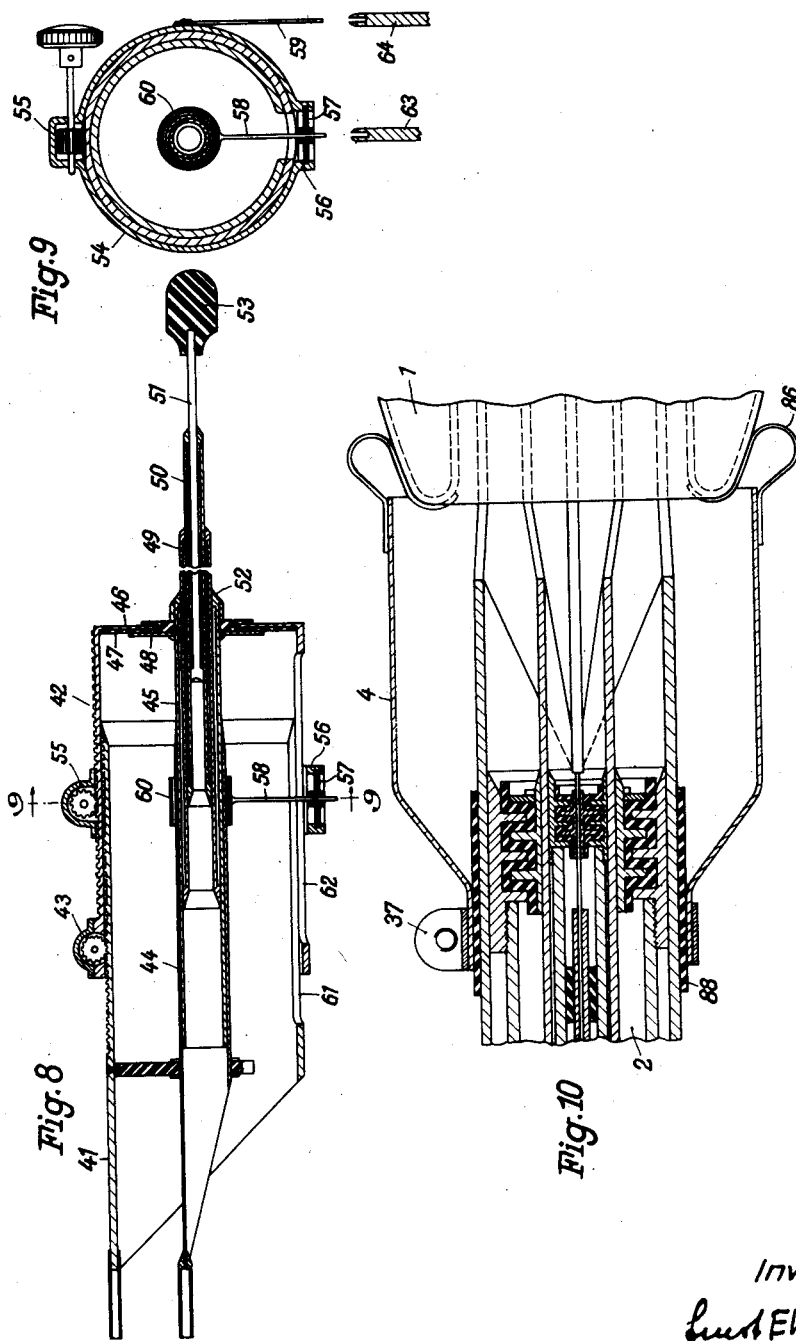
Inventor:

March 1, 1938. E. E. W. KASSNER 2,109,843
APPARATUS FOR GENERATING AND APPLYING ULTRASHORT ELECTROMAGNETIC WAVES
Filed Sept. 15, 1934 11 Sheets-Sheet 5
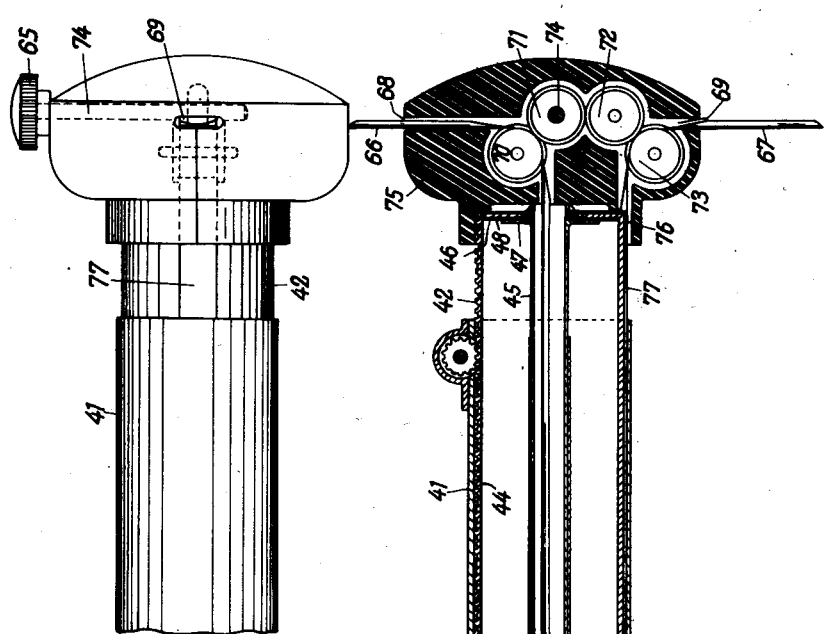
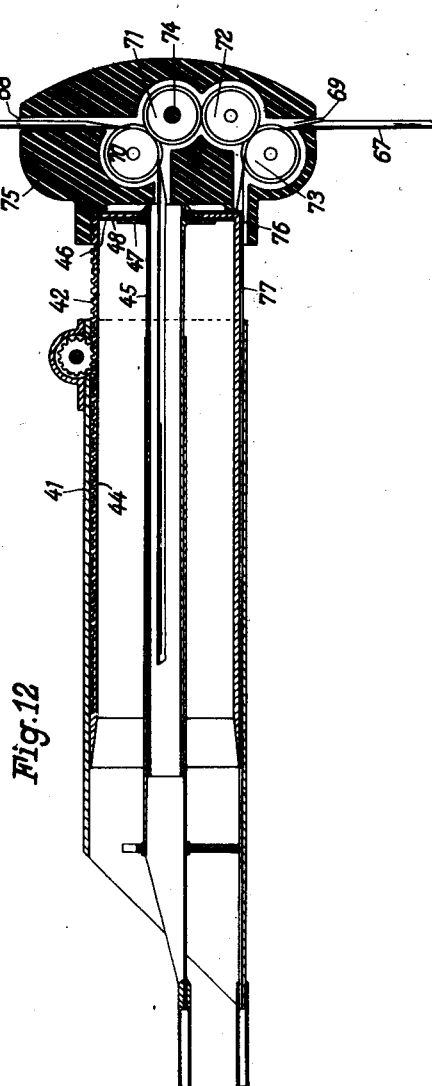
Fig.11
Fig.12
Inventor:

March 1, 1938.   E. E. W. KASSNER   2,109,843
APPARATUS FOR GENERATING AND APPLYING ULTRASHORT ELECTROMAGNETIC WAVES
Filed Sept. 15, 1934   11 Sheets-Sheet 6
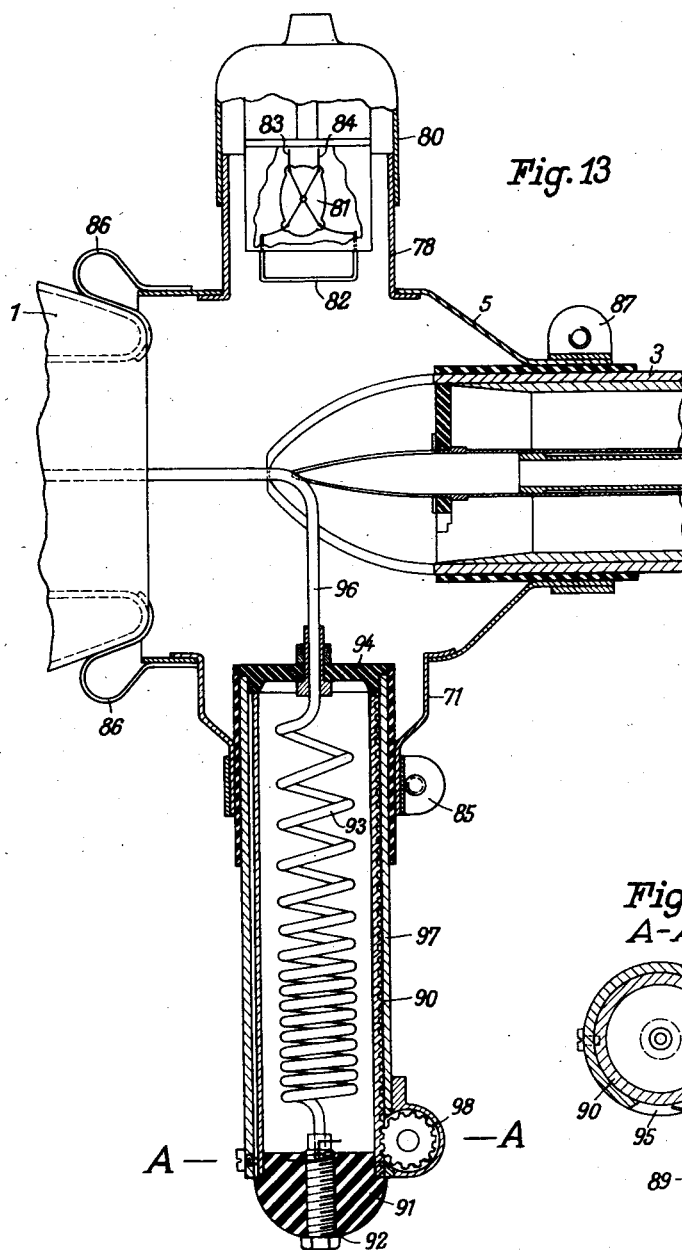
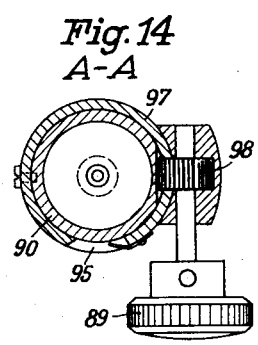
Inventor:
E. W. Kassner
Hauff Varland
attys.

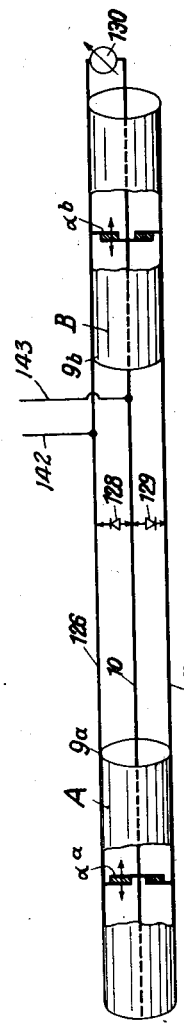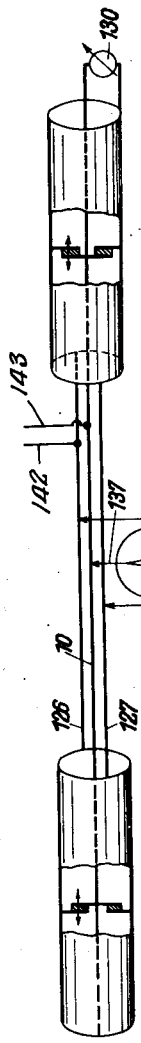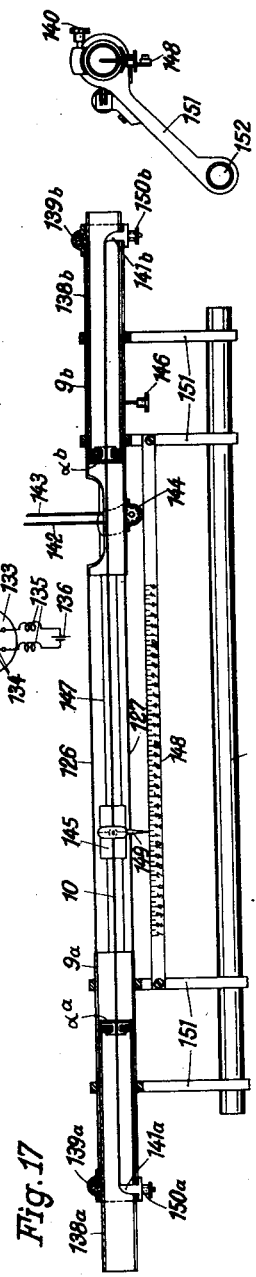

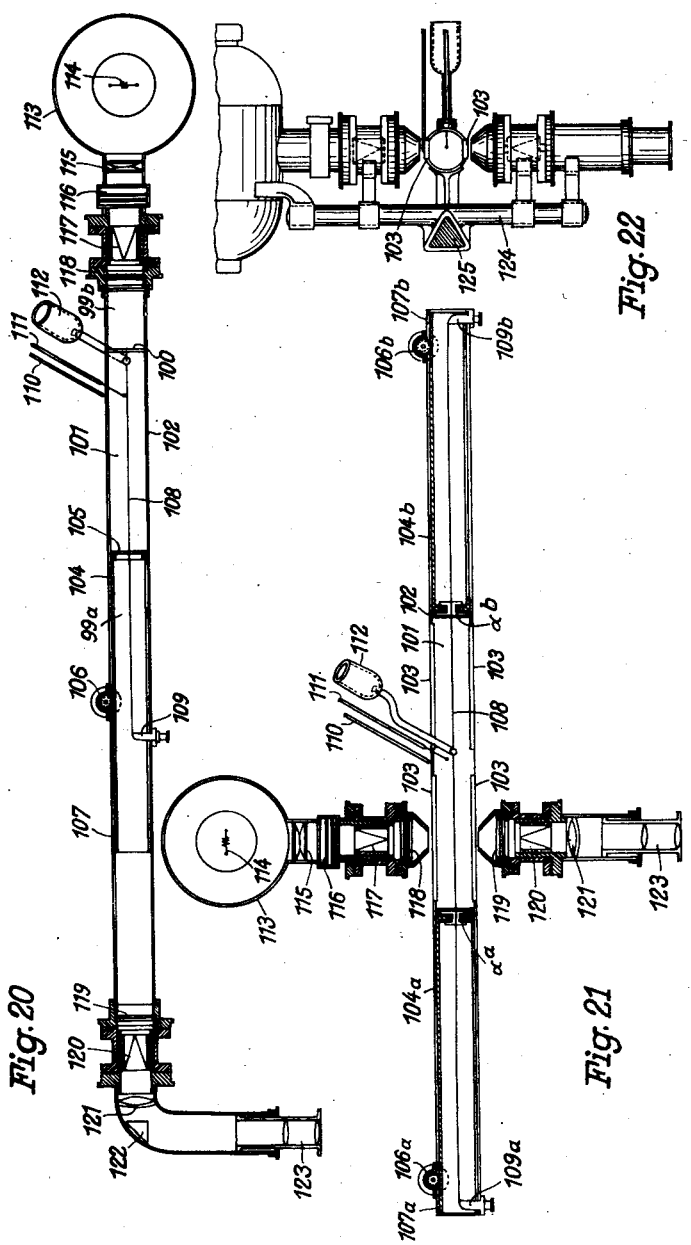

Patented Mar. 1, 1938

2,109,843

UNITED STATES PATENT OFFICE 2,109,843

APPARATUS FOR GENERATING AND APPLYING ULTRASHORT ELECTROMAGNETIC WAVES

Ernst Eduard Wilhelm Kassner, London, England

Application September 15, 1934, Serial No. 744,159½
In Germany August 31, 1933

12 Claims. (Cl. 250—36)

Subject of invention is an oscillation generation and tuhing system for the quasi-optical and ultra-short wave spectrum for increased effective power which is joined together with radiating devices in such a manner that by means of application of the principle of total reflection in concentric tube conductors and further novel wave-electric devices a universal apparatus is presented as subject of invention, being especially equipped for the most varied purposes of application, testing and measuring within the ultra-short wave range.

Such an organic-uniform combination of devices for generation and employment of energy to only one instrument is unknown in high frequency physics of quasi-optical and ultra-short wave range, so that the present invention fills out a void in research as well as in technics and allows for manifold uses resulting out of interaction from oscillation energies towards dipole substances in the region of dielectric resonance polarization by irritations of anomalous dispersion and absorption strips.

For instance, and apart from the technics of communication, there are vast possibilities of employment to the spectrum of the centimetre and decimetre wave lengths, that is for organic and physical chemistry as well as for electro-optics, for specific electro-medical purposes as well as for many applications concerning biological action and reaction. According to the dipole theory of anomalous dispersion of Debye and numerous experimental tests the relaxation frequencies and the natural frequencies, respectively,—the so-called anomalous dispersion strips—of biological and organic molecular structures of all substances, denoted as dipole substances, lie in the region of frequency of spectrum of the quasi-optical and ultra-short waves. The electro-magnetic oscillation energy of the before-mentioned waves enters into interaction to the dipole substances, whereby directing effects and influence of substances, partly unknown up to the present, are released so that the present invention can be put into action for the most varied purposes mentioned above.

Figure 1 shows the instrumental structure of the object of invention fully developed in construction. On both sides of and symmetrically to the vibromotive electron valve for which a special transmitter valve 1 is used, the tuning cylinder tube resonator 2 and the antenna or coupling resonator 3 carried by supports 8 (Fig. 1ª) of insulating material are placed and combined with the electron valve through the valve connecting sockets 4 and 5. Below these devices, and equally sustained by insulating supports, there are a wave length measuring system 6 and a cylinder resonator system 7 equipped with different optical devices for electro-optical purposes, influences and observations of the dielectric resonance polarization of dipolar substances, which are brought into the cylinder resonator system.

With all, wave conductor parts of this instrumental structure the principal of total wave reflection by means of energy conduction in concentric tubes is applied, the per se advantageous qualities of these arrangements of tubes being fully developed by different devices according to invention.

Figures 2-22 serve for the description of the particular structure of individual parts of this device and of the details of invention, while Figures 23-34 show schematic examples of the different types of connection by using cylinder-tube-resonators in combination with the transmitting system.

The wave-electric distributions of current and voltage duly taken into consideration, the concentric tube resonators distinguish themselves by insensibility to exterior influences as well as by particularly good conditions of reflection with only slightest loss of power especially when applied to the decimetre and metre wave-length range. The use of single tube resonators, in connection with ultra-short wave generators is known, however, in these arrangements the parts used for tuning bridges are either unfit or possess capacities of reflection the efficacy of which is not sufficient in order to cause an optimal reflection as terminating impedance so that a determination of the tuning or the formation of the oscillation nodal point is not given.

Figure 2:
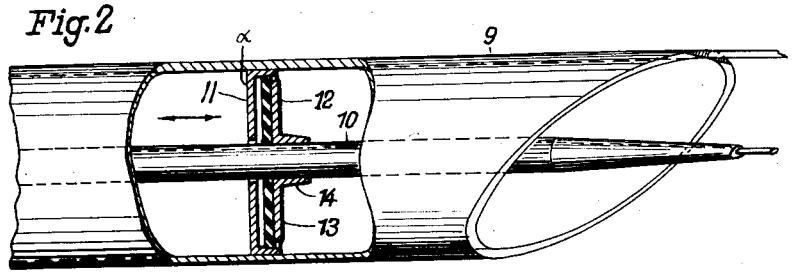

In exploitation of the physical fact that the electric field lines of the standing waves developing on the concentric wave resonator system are normal to the surface of the conductor and that the lines of the current intersperse in beam-shape the bridge conductor of this wave conduction, the tuning and reflection bridge, according to invention is formed as plate condenser in such a manner that the beam-shaped lines of the current permeate the dielectric as displacement current on its natural unconstrained way of diffusion. Hereby the geometric symmetry of the nodal position of the oscillation is optimally fixed in the concentric tube arrangement simultaneously with a total reflection of the electromagnetic wave, as with this construction and manner of action of reflecting point the oscillation anode must develop itself on the central diametre of the piston-shaped reflection bridge. For the purpose of increasing the effective capacity of this symmetry reflection piston an arrangement of several layers of metal plates and dielectric is employed. Figure 2 schematically shows details of principle of the cylinder tube resonator. The concentric conduit consisting of tubes 9 and 10 encloses the movable reflection piston α which is shown partly in section, the metal plates 11 and 12 of which slide along the inner surface of the external tube 9 and the outer surface of its internal tube 10, the plate 11, being in metallic contact with the outer tube 9, the plate 12 being in metallic contact with the inner tube 10. Both plates are centralized into a uniform body in a suitable manner with an interpolation of the dielectric 13. To improve the places of contact the metal plates possess slotted contact rings 14 the laminae of which flexibly lean against the tube walls. The piston constitutes, in effect, a condenser the plates of which are connected to the outer and inner tubes, respectively.

The end of the tube of the tuning resonator leading to the electron valve oscillation generator is bevelled and the internal conductor tapers in the same direction, so that a constant transition from the impedance subsistant in the concentric tube conduit over to the impedance of the parallel conduit, which mediates the junction to the electrodes of electron valve, is guaranteed. This is a simple but very efficacious way to avoid the shock following on a direct joining together of two wave conductances of different impedances, which shock in every case causes undesirable reflections and losses in radiation. The bevelling of the tube end is suitably produced by a sectional area, forming a more or less large sloping angle with the axis of the tube, so that the sectional drawing or its projection forms an ellipse.

Figure 3:
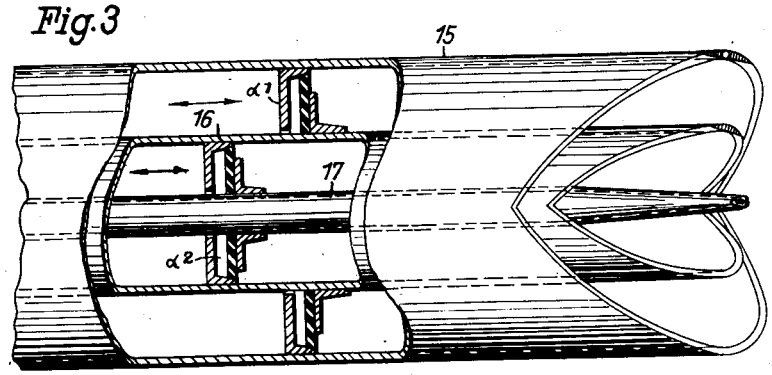

The multiple cylinder tube resonator represents a further arrangement according to invention allowing for an adjustment and tuning of multiple circuits independently from each other for ultra-short and quasi-optical waves as for instance required with various forms of transmitter systems. Figure 3 shows the schematic construction of a double cylinder tube resonator employing the symmetry reflection pistons. One wave conductor arrangement is formed by external tube 15 and central tube 16, while internal tube 17 and central tube 16 constitute the other one. For this purpose the proportions of the tube diameter have to be such as to allow for both tube systems possessing approximately the same characteristic impedance. The construction of the symmetry reflection pistons $\alpha^1$ and $\alpha^2$ corresponds exactly to that of the symmetry reflection pistons shown by Figure 2. They allow to be displaced independently from each other as shown by arrows. By the central tube 16 a screening and/or tuning-out of both wave conductor circuits is given.

In this arrangement the tube ends leading to the generator are doubly bevelled, thereby effecting a uniform transition of the impedance, in this case towards two opposite points, to which separate parallel wire wave conductor systems can be connected which are forcedly paralleled in the tube resonator and consequently tuned in common.

Figure 4:
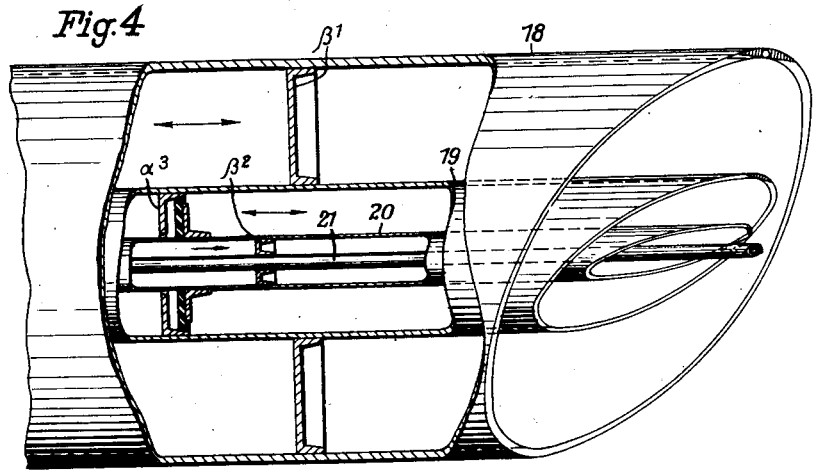

On interposing an additional wave conductor system between the two cylinder tube arrangements described above, the multiple cylinder tube resonator according to Figure 4 is obtained. Between external tube 18 and first inter-tube 19 as well as between internal tube 21 and second inter-tube 20 shiftable metallic reflection pistons $\beta^1$ and $\beta^2$ are arranged possessing a contact ring consisting of flexible laminae, just as the capacitive symmetry reflection pistons. In the present case both these wave conductor circuits form the push-pull tuning and oscillation system for the grids and the anodes of the push-pull transmitter valves. Their tube diameters are selected in such a way that an approximately homogeneous characteristic impedance prevails in both systems. The inter-tubes 19 and 20 form another intermediate or coupling circuit for the external and internal system through the symmetry reflection piston $\alpha^3$ executed just like piston α in Figure 2. When employing capacitive symmetry reflection pistons instead of the metallic reflection pistons $\beta^1$, $\beta^2$, the result is a triple conduit tuning system for three oscillating systems more or less independent from each other. The ends of the tube system leading to the oscillation generation valve are likewise shown bevelled in order to reduce the effect of the shock joints and, if necessary, can get a bevelling as per Figure 3.

In consequence of the almost maximum reflection capacity of the symmetry reflection pistons, the tube parts lying behind these spots do not carry ultra frequencies, so that in this part of the tube system suitably on the tube ends, the supply of the operating voltage can take place without influencing the oscillations.

Figures 5, 6, 7 will interpret the constructive building-up of the double-tuning cylinder tube resonator shown in Figure 3. The external tube 15 which is bevelled to the junction side of the generator as demonstrated, is the bearer of construction. The symmetry reflection piston $\alpha^1$ consists of an arrangement of various superimposed metal plates 11, 12 and dielectric 13 and is fastened to a slotted driving tube 26 equipped with longitudinal toothing. By the small tooth-wheel 27 situated at the external tube 15 and by means of turn button 28 the shifting of the piston, the actual position of which can be determined by the reading aperture 25 through which a scale engraved on the driving tube 26 becomes visible is effected. By means of the guiding bridge 29 consisting of insulating material and fastened to tube 15, tube 26 gets its coaxial position and is protected against contortion by the slot conduction carried by the same insulating bridge. The guiding bridge 29 is at the same time support and fastener for the inter-tube 16 which is bevelled to the junction side of the generator, like tube 15, and on the external and internal walls of which the symmetry reflection pistons $\alpha^1$ and $\alpha^2$ are sliding along. Piston $\alpha^2$ is executed just like piston $\alpha^1$ and is driven to motion by the driving tube 32 possessing longitudinal toothing and engraved scale as does driving tube 26. The small tooth wheel 33 effecting the shifting of the driving tube 32 is placed inside the driving tube 26 so that by shifting piston $\alpha^1$ the piston $\alpha^2$ is equally displaced to the same extent, and consequently both pistons preserve their relative position to each other. The manipulation of the small tooth-wheel is effected by turning button 34. An insulating part 35, fastened to the driving tube 26, serves as sliding conduction for the driving tube 32.

The two telescope-shaped tube conductors 17, 36 which can slide into each other, form the internal leader. The tube conductor 17 is sustained by an insulating disc 38 fastened to the inter-tube 16, and the tube conductor 36 is fastened by means of insulating boxes 39 and 30. Along with the tube 36 the metallic socket 31 connected to it is inserted into the box 30 for the purpose of receiving the voltage-leading cable. The supply of voltage to the inter-tube 16 is effected by the socket 22 and with the assistance of the long screw 23. Through the socket 24 fastened to tube 15 the operating voltage is supplied to the tube.

On the opposite side of the symmetrically formed electron valve ultra-short wave generator and in organically systematical order thereto we find the radiation system which takes on a novel form and offers new possibilities of application by further use of concentric tube-conduits, in so far as it can be used in the first place as tunable reflection system and, after previous tuning, to resonance may be used as tuned radiation system, or, as an energy transporting and coupling system.

Figures 8, 9, 11, 12 are to explain the working and manner of application as well as the constructive building-up of the combined aerial and coupling resonator.

Figures 8 and 9 show the longitudinal and the profile section of a tunable aerial resonator, with a linear radiator which can be pulled out telescope-like and with adjustable coupling system. The tuning tube 42, shiftable by means of gear drive 43, is arranged above the chief tube 41 (Figure 8) which is bevelled towards the side of the generator. The tuning tube is terminated by the semi-permeable capacitive reflection bridge which defines the nodal point of the electromagnetical oscillation and which consists of the plate 46 metallically connected with the tuning tube 42, the dielectric 47 and the plate 48 fastened to the shiftable telescope tube 45 situated within the internal tube 44. The permeability of this reflection bridge can be varied by changing the diameters of the plates 46, 48. The linear radiator which can be pulled out is formed by the tubes 49, 50, 51 sliding into each other telescope-like, of which tube 49 is shiftable within the telescope tube 45 and is led through box 52, while tube 51 has an insulated handle 53 for adjusting the linear radiator.

The further device accomplishes the second task of this combined part of transmitter as coupling or energy-substracting system which, when applied with inserted linear aerial, supplies the transmission energy of the transmitter to another receiver. The tuning tube 42 (Figures 8 and 9) carries a short metallic piece of tube, 54, sliding by means of gear drive 55, which carries the internal coupling conductor 58 through a cylindrical prolongation 56 and an insulating plate 57 and to which, in addition, the external coupling conductor 59, is fastened. The coupling conductor 58 is connected to a tube piece 60 enclosing the internal tubes 44 and 45, with small spacing therebetween. Thereby a capacitive coupling to the internal conductor of the concentric tube arrangement is given, by means of which the oscillation energy can be led to the receiving or measuring system free of direct voltage. The longitudinal slots 61 and 62 situated in tubes 41 and 42 allow for the free shifting of this coupling system. They have to be wide enough so that any notable interference capacity between internal and external tube can be prevented. For the same purpose the coupling conductor 58 has been fastened to sliding tube 54 by cylinder prolongation 56, by means of which the greatest possible distance of air or dielectric, respectively, is effected between conductor 58 and the external tube for diminuation of capacity. The longitudinal shifting allows for a considerable displacement of the coupling point so that the latter can be interposed almost into the potential node as well as into the maximum of tension, according to whether it is situated in proximity to the reflection plates 46, 47, 48, or whether it is being moved towards the generator side. This offers the possibility of continually varying the quantum of the energy to be detracted. For the purpose of leading the supply to the receiver, the prolongation conductors 63, 64 are slipped on to the ends of the coupling conductors 58, 59. The connection of a tunable dipole radiator with the equally tunable supplying tube resonator is shown in Figures 11 and 12. The arrangement of the tuning tube 42 sliding within the external tube 41 with reflection bridge 46, 47, 48, and the telescope tube 45 shiftable within the internal tube 44, corresponds to that of Figure 8. The guiding part 75, consisting of insulating material, is fastened to the tuning tube 42 of Figure 12. The friction wheels 70, 71, 72, 73, the surfaces of which are covered with an elastic coating, for instance with rubber, are situated within this guiding terminal 75. The elongated axis 74 of the wheel 71 ends in the turning button 65 (Figure 11), the manipulation of the latter moving all wheels by friction drive. The copper-plated metal strips 66, 67 (Figure 12) which have a sector-shaped cross section and consist of the best flexible material, for instance steel- or bronze-tin run between the wheels 70, 71 and 72, 73. They get their direction within the guiding part 75 by the guiding slots 68, 69 in such a manner that they are lying in one axis. The free dipole ends projecting from the guiding part 75 possess a large natural stability owing to their shape, so that they keep the direction given to them without bending, even in case of considerable free lengths. The other end of the strip 66 is shiftable within the telescope tube 45, to the internal wall of which, and owing to its spring effect, its longitudinal edges lean contact-giving. Strip 67 is conducted through the guiding slot 76 into the notch 77 engraved on the external wall of the tuning tube 42 and is slipped into same for the purpose of obtaining a good contact. The metal strips comprise a scale which registers the length of the dipole radiator which has been removed.

With this example of execution of the aerial resonator the coupling arrangement described by Figures 8, 9 can be likewise used in just the same manner.

The afore-mentioned parts, i. e. the multiple oscillator and the aerial and coupling oscillator are connected with the electron valve by valve-connecting-sockets as shown in Figures 10 and 13. Owing to these connecting parts the transmitter system represents a uniform structure as shown in Figure 1, in which these valve connecting sockets are numbered 4 and 5.

The valve-connecting-socket Figure 10 consists of a cylindrical metal body 4 squeezed into a suitable shape, into the smaller opening of which the tuning resonator 2 projects, being fastened by means of the clip 37 over an insulating separator 88. The electron valve 1 is supported by the flexible metal clamp 86 in the large opening of the socket. Its wave-conducting leading-in electrodes run into the bilaterally bevelled tube ends of the tube resonator 2 developed according to Figure 3.

In case that several tube oscillators are to be connected to one side of an electron valve as shown in Figures 27, 28, 32, 34 the valve connecting socket gets one or two additional cylindrical prolongations 78 and 79, as shown by Figures 13, 14, in which, for instance by means of clip 85 (prolongation 79) additional tuning tube resonators or concentric conduits or a tuning resonant choking arrangement are fastened as for example shown in Figure 13. Other concentric tube arrangements can likewise be attached by means of the cylinder prolongation 78; another possibility of application is shown by Figure 13. The end of the tube 88 which fits on to the prolongation 78 by means of a sliding seat contains a thermo-indicator 81, the high frequency connection of which is connected to the wire clamp 82 serving as coupling-turn. The connections of the thermo-electric couple 83, 84 lead to the indicating-instrument 85 shown in Figure 1. This device permits the control of the energy of the transmitter. It can be varied in its sensitivity by bringing closer or further removing the coupling turn 82 from or to the oscillatory conductance in the valve connecting socket. The metal body 5 of the valve connecting socket has, for the rest, the same shape as the one shown in Figure 10. An additional tube resonator is fastened in its smaller opening by means of clip 87, said resonator in this example being represented as an aerial resonator according to Figure 12, while the glass bulb of electron valve 1 is supported by means of the flexible metal clamp 86. In this drawing the wave conductors subside into a plane which is in vertical relation to the level of the drawing; the centrally situated cathode supply connector 96 leads to the above-mentioned tunable resonance-choking arrangement, the constructive building-up of which is described below.

The main tube 97 fastened in the valve connecting socket carries the gear drive 98 which is put into action by the tuning button 89 depicted in the intersection drawing Figure 14, thereby effecting within tube 97 a gliding motion of the sliding tube 90 equipped with longitudinal teeth. The insulating button 91, into which the socket 92 destined to pick up the heating cable is inserted, is fastened to this tube 90. In its turn the choke 93 with variable pitch of turns, the other end of which is supported by the insulating plate 94 which is fitted on to the main tube 97, is fastened to the socket 92. On moving the sliding tube 90 out of the main tube 97 by means of gear drive 98, the length of the choke 93 changes simultaneously. This causes an alteration of its electric qualities, that is of its self-induction and self-capacity, so that by this extending of length an alteration of its resonant frequency, which is conditioned by the electric values, is effected. The reading or registering aperture (Figure 14) shows the actual extension of the choke as to favourable reflection effects by means of a scale fitted on to the sliding tube 90, and which can be adjusted reproducibly.

The application of the parallel wire system as wave-length-measuring device for ultra-short and quasi-optical waves by using shiftable plate bridges has different disadvantages. The adjustment of the plate bridges is only possible up to a certain degree of precision, but not sufficient for precisional wave measuring. On reading off the plate positions a slight sloping of the plates can further enlarge the error-limit of the measuring. An additional impairment of precision in measuring lies in the fact that the parallel-wire wave-conductor plate-bridges can hardly be made large enough to cause a total reflection. The present invention avoids these disadvantages by the fact that the measuring wire system is attached to both sides of tuning tube resonators in which the before-mentioned reflection-pistons of the invention can be adjusted to precisely reproducible values by means of drive shifting, and which possess a remarkably greater power of reflection in comparison to the plate bridges. The parallel wire system is developed as differential system (Figure 15) in such a manner that the two tube resonators developed according to Figure 2 are connected with each other by the mutual wire 10 as well as by the two external conductors 126, 127, ending at the tubes 9ª and 9ᵇ and situated on the same plane as the neutral wire 10. αª and αᵇ are the symmetry reflection pistons sliding within tubes 9ª and 9ᵇ. This differential arrangement of the parallel wire wave conductors allows for the employment of a duplex rectification by means of the two rectifiers 129 and 128 the direct currents of which are indicated by the instrument 130, a raising of sensibility being caused thereby and the effect of the electrical shock point at the junction of the tube conductor and the parallel wire conduction being reduced. On employing duplex diode rectifier valves this arrangement offers the advantage that the wire 10 forms the symmetrical return line which, with the two-wire system, has to consist of a special flexible conduction. Figure 16 shows a schematic diagram of connections of such an arrangement. The conductors 10, 126, 127 correspond to the parallel wire conductors represented in Figure 15. The anodes 131, 132 of the duplex diode valve 133 are connected to conductors 126 and 127. The heating filament 134 is fed from the battery 136 by way of the choked conductor 135 and possesses a central tapping 137 which is connected to conductor 10. The direct current is indicated by instrument 130 which is connected to the internal conductor and the resonator tube. Its arrangement within the whole construction is shown in Figure 1 being equally marked 130. A further possibility of employing the wave length measuring system is given by its application as measuring device for dielectric constants of fluids with high conductivity. A condenser tank which is shiftable on the measuring wire and is filled with the fluid to be tested, is arranged together with the described wave indicators (detector, diode valve etc.). The measuring of the dielectric constant is accomplished by means of the well-known method of Drude by definition of the bridge shortening caused by the loading of the circuit by the measuring condensor.

An example for the constructive building-up of a wave-length measuring system is to be given by the Figures 17—19.

The cylinder tube oscillators consisting of external tube 9ª, 9ᵇ, the symmetry reflection pistons αª, αᵇ and internal conductor 10 are arranged on both sides of the proper measuring wire system. The symmetry reflection pistons are fastened to a driving tube, 138ª and 138ᵇ, shiftable within tube 9ª and 9ᵇ, having on its external wall and parallel to the tube axis a toothing into which the small tooth-wheel of the gear-drive catches. The displacement of the symmetry reflection pistons, the actual position of which can be read off from the scale engraved into the surface of driving tube 138ª, 138ᵇ, is effected by means of the turning buttons 140ª, 140ᵇ (Figure 18) fastened to the axis of the small tooth-wheel. The internal conductor 10 is supported and stretched above the shores fastened to external tube 9ª, 9ᵇ, concentrically to the tube system. The tubes 138ª and 138ᵇ possessing longitudinal slots, they are not hampered in their longitudinal motion, but are protected against a transverse distortion to the moving direction, which distortion would damage the small toothwheels. The supply of energy is effected by the wave conductors 142, 143. Wave conductor 142 leads to the external tube 9ᵇ, wave conductor 143 can be brought into more or less close proximity to the internal conductor 10 for the purpose of varying the coupling. The coupling point itself is also variable. The gear drive 144 serves for this purpose, allowing for a parallel displacement of both coupling conductors within the cut of tube 9ᵇ.

The measuring wire system consists of the internal conductor 10 and the two external conductors 126, 127 connecting the concentric tuning resonators. The testing carriage 145 which can be moved through a cord gear and by a turning button 146 in order to slide along insulating tube 147, serves for supporting and moving the wave indicator or the measuring condenser tank. Its occasional position is indicated by a pointer 149 fastened to it and moving about the scale 148. The connection of the indicator instrument is effected by the terminals 150ª or 150ᵇ which are attached to the shores 141ª and 141ᵇ and where the internal tube 10 terminates, as well as by the external wall of tube 9ª and 9ᵇ. The whole measuring system is fastened to the main supporting tube 152 by four inclining supports 151 consisting of insulating material.

A cylinder oscillating device, designated as electro-optical polarimeter, serves for the testing of the before-mentioned influence and interaction effects of the quasi-optical and ultra-short waves on dipole substances as well as for definition of those constants from which the wave length required for the release of the resonance dispersion effects for the excitation of an anomalous absorption and dispersion strip is determined. The novel principle of this device consists in that the influencing of the substances in question, which are filled into a concentric tube conductor, is effected by means of reflection devices, whereby the ensuing directional effect which makes the dipole fluid doubly refracting, becomes noticeably prominent in consequence of the concentrated electro-magnetic field of oscillation, while, on the other side, this directional effect can be released by a relatively small amount of energy. Metallic reflection pistons or symmetry reflection pistons or glass plates one side of which is covered with a light-permeable goldlayer produced by cathodal spraying through which polarized light is transmitted, serve as reflection devices.

Figures 20, 21, 22 show constructive examples of execution of electro-optical polarimeters; there are two fundamental possibilities of executing the polarimeter, which differ from each other by the fact that, with one of them, the polarized beam of light intersperses the whole space of influence in the longitudinal direction of the tube axis (electro-optical longitudinal polarimeter), while, with the other, it is sent through the space of influence in transversal direction thereto (electro-optical transversal polarimeter).

Figure 20 shows an electro-optical longitudinal polarimeter.

The fluid to be tested is enclosed within the absorption space 101. This space is formed by the main tube 102, by the gold-layer glass plate 100, solidly connected to the former, and by the gold-layer glass plate 105 fastened to piston tube 104. The tube 104 is adjusted in liquid-proof way to tube 102 by means of piston rings and, for adjustment to resonance, can be shifted within same by means of gear drive 106. Through the opening 107 on tube 102 the scale on the tube 104 on which the actual position of the reflector plate is marked, becomes visible. The silver wire 108 constitutes the internal conductor of the concentric tube arrangement and is, on the one hand, fastened to the gold-layer glass plate 100 in conducting contact with the gold-layer and, on the other hand, to the shore 109. The internal conductor is led liquid-proof through a metallic guiding box of the gold-layer glass plate 105, through which it is in conducting connection with the gold layer, in such a manner that the shifting possibility of this reflection gold-layer glass plate is preserved. The supply of energy is effected by the wave conductors 110 and 111 of which 110 is fastened to the external tube, while 111 can be more or less brought into proximity to the internal conductor 108 for the purpose of coupling variation. The balancing tank 112 receives the liquid displaced from space 101 by the movement of the reflection pistons 105 and attends to the constant filling of the observation space, in every piston position free of air bubbles.

The way of the ray of polarized light necessary for the observation of the polarization act is the following:

The light of the punctiform source of light 114 situated within the screening 113 is gathered into a beam of parallel rays by the condenser set 115 and, after having passed the heat- and colour-filter-set 116, enters by way of the Nicol's polarization prism 117 and the ¼ wave length mica plate 118 and through the gold-layer glass plate 100, into the observation space 101, leaves it again through gold-layer glass plate 105 and, by way of the ¼ wave length mica plate 119, arrives at the analyzer prism 120 and, through the lens system 121 and prism 122, at the ocular 123.

The gold layers of the plates 100 and 105 cause a certain loss of light and, in certain cases, effect a disturbing colouring of the beam. In another form of the electro-optical longitudinal polarimeter the gold-layer glass plates 100 and 105 are supplanted by simple plane-parallel glass-plates, the reflection tuning being effected in a special tube resonator by means of symmetry reflection pistons.

While with this arrangement it is possible to observe the resulting effect in its totality, the transversal observation device shown in Figures 21, 22 allows for a testing of the polarization effects at any chosen point of the influencing space, that is the observation of the change of effect in dependence of the field distribution and of the intensity of the electro-magnetic field, respectively.

Accordingly the shape of influencing space 101 (Figure 21) is altered. The glass windows 103 allowing for a transversal irradiating of the space 101 are cemented into the main tube 102. On the inner side they are fitted out with a gold layer which is in contact with the internal wall of tube 102, and are shaped correspondingly to the tube wall. In the drawings these windows are drawn as flat glass plates. The symmetry reflection pistons $\alpha^a$ and $\alpha^b$ fastened within the tubes 104$^a$ and 104$^b$ and constructed in accordance to Figure 2, serve as reflection pistons, in this arrangement. The tubes 104$^a$ and 104$^b$ are shiftable within the main tube 102 by means of the gear drives 106$^a$ and 106$^b$ and the wall of the main tube as well as the internal conductor 108 which is stretched above the shores 109$^a$ and 109$^b$ are made liquid-proof by means of piston rings and insulating boxes without impairment of the sliding capacity. The apertures 107$^a$, 107$^b$ allow for the reading-off of the position of the pistons by means of the scale engraved on tubes 104$^a$ and 104$^b$. The tank 112 is again intended as filling and compensating reservoir. The coupling of energy is effected in the same manner as shown in Figure 20, i. e. through the wave conductors 110 and 111. The optical device which is shiftable parallel to the main-tube of the above-described electric device, is supported by the tube holder 124 through several supports. The entire optical system can be moved by the metallic three-edged rail 125, shown in section drawing (Figure 22), by means of gear drive or the like. The single parts of the optics as well as the way of light correspond to the parts 113–123 of Figure 20, only the prism 122 being left out in this straight-sight arrangement.

For the influencing of larger quantities of fluids to which a fixed quantity of energy is to be supplied, the reservoir 112 may be replaced by means for continuously circulating the liquid through the influencing space so that each liquid element in consequence of the uniformly timed stay in the influencing space absorbs the same quantity of energy. A frequency fine-tuning is obtained owing to this measure, because the position of the absorption maximum within the frequency spectrum can be altered in very fine graduations through changing the temperature of the dipole liquid while a fine tuning of transmitter to the absorption frequency in question presents certain difficulties. The main factor of this arrangement consists in the possibility of continuously controlling the influencing process by means of the optical device.

As, with the electro-optical transversal polarimeter Figures 21, 22, the internal and external conductors of the concentric tube arrangement are insulated from each other by means of the symmetry reflection pistons, an electro-static field can be produced in the influence space by establishing a direct voltage in relation to both these conductors, this electro-static field being superimposed to the electro-magnetic alternating field and releasing additional directing effects.

The numerous possibilities for employing the tunable single- or multiple cylinder tube resonators with shiftable symmetry reflection pistons are to be illustrated by some circuit schemes. Three-electrode-valves as well as various transmitter valves without and with various multiple grid valves are drawn as electrode valve generator.

Figure 23:
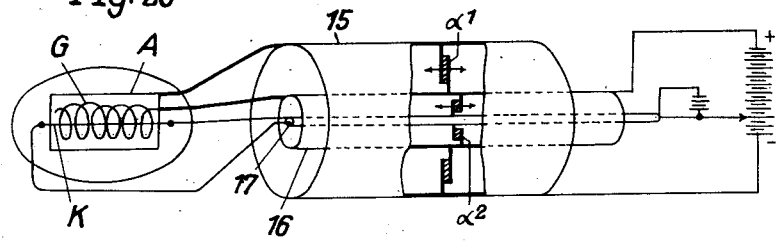

Figure 23 shows the connection of a duplex tube resonator, according to Figures 3, 5, 6, 7, to a three-electrode valve. The anode A is connected with the external tube 15, the grid 6 with the inter-tube 16. For the purpose of simplifying the illustration these tubes are not bevelled in the drawings. This grid-anode circuit is tuned by the symmetry reflection piston $\alpha^1$ indicated schematically. One pole of the filament circuit is connected to the internal tube 17, while the other, being insulated, is led through this tube. The second tuning circuit is given by the concentric tube conduction which consists of tube 16 and tube 17 and the shiftable symmetry reflection piston $\alpha^2$. The battery voltage is supplied at the tube ends situated on the other side of the symmetry reflection pistons which carry no oscillation energy. The drawings show an electric brake field connection transmitting a high positive tension to the grid and a low negative tension to the anode opposite to the cathode.

Figure 24:
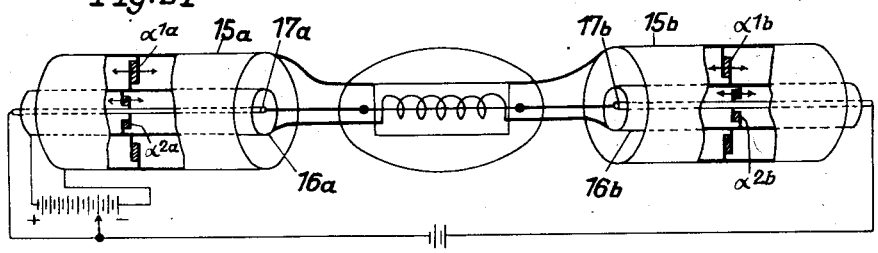

A better possibility, from the wave-electric point of view, of connecting the multiple tube resonator is given by employing a symmetrically constructed three-electrode valve with leading-in wave conductor. Figure 24 shows such a valve having two duplex tube resonators for the purpose of double-sided tuning. The tubes 15$^a$, 16$^a$, and respectively 15$^b$, 16$^b$ again form the grid-anode tuning circuits, while the cathode connection is double-sidedly tuned against the grid by means of the concentric tube connection 16$^a$, 17$^a$, and 16$^b$, 17$^b$. The voltage supplies are represented in analogy to Figure 23 for electric brake field operation.

Figure 25:
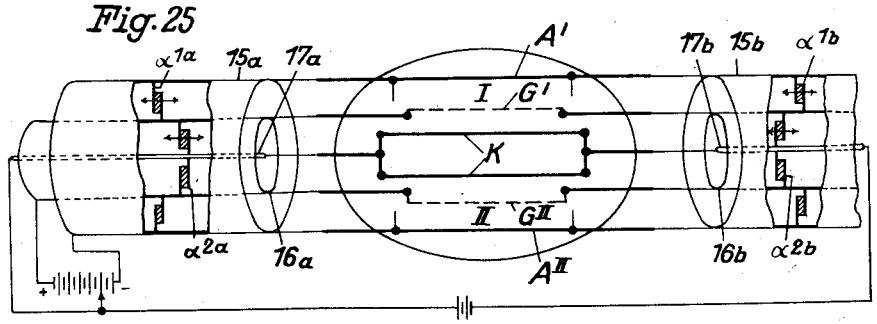

In the following connections the possibilities of application and communication of the single or multiple tube resonators with symmetry reflection pistons on to transmitter valves are represented. These are electron valves with which two separate electrode systems are arranged around a mutual cathode arrangement and coupled by same. Figure 25 shows a two-sided multiple tuning with which the grid anode-and/or the grid cathode-circuits of the various systems of the electron valve generator can be tuned both-sidedly by double tube resonators as shown by Figures 23, 25, 26, 27. The wave conductors of the anodes A$^I$ and A$^{II}$ lead to the left of external tube 15$^a$ of the double tuning resonator and are thereby parallel connected. They are in the same way connected to the external tube 15$^b$ of the multiple tuning resonator on the right. The wave conductors of the grids G$^I$ and G$^{II}$ are likewise led in parallel connection to intertube 16$^a$, 16$^b$. The internal tubes 17$^a$, 17$^b$ form the prolongation of the wave conductors connected to cathode K. Consequently there exist 4 oscillation systems, adjustable independently from each other, that is the two grid anode circuits formed by the tubes 15$^a$, 16$^a$ and 15$^b$, 16$^b$ as well as by the reflection bridges $\alpha^{1a}$ and $\alpha^{1b}$, and the grid cathode circuits formed by the tubes 16$^a$, 17$^a$, 16$^b$, 17$^b$ and the bridges $\alpha^{2a}$ and $\alpha^{2b}$. In this figure as well as in the following the battery connections are always effected on the non-oscillating ends of the tube resonators.

As the symmetry reflection pistons are developed into capacitive bridging condensers, a chosen supply of voltage can be led to the electrodes, so that, apart from the electric brake field connection, other methods of operation, for instance undamped connections with falling characteristic property or control connections can also be used.

Figure 26:
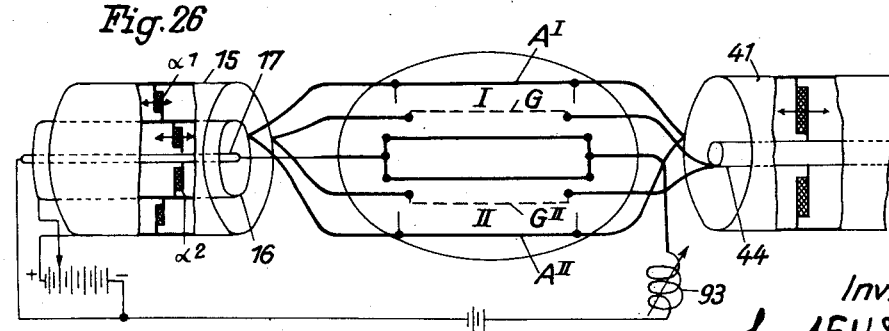

In Figure 26 the wave conductors of the anodes A$^I$ and A$^{II}$ and of the grids G$^I$ and G$^{II}$ are joined together in parallel before the connection to the tube resonator so that only one wave conductor is connected to each tube. By changing the position of these connections another arrangement of the tuning circuits has been obtained. The wave conductors of the grids $G^I$ and $G^{II}$ lead to the external tube 15 of the duplex resonator, those of the anodes $A^I$ and $A^{II}$ to the inter-tube 16, while the cathode circuit wave conductor is connected to the internal tube 17 as before. Consequently tubes 15 and 16 and symmetry reflection piston $\alpha^1$ form the anode-grid oscillation-and tuning circuit, while a tuning between anode and cathode is achieved through tubes 16 and 17 and symmetry reflection piston $\alpha^2$. An aerial resonator according to Figure 8, is connected to the right of the transmitter valve. The wave conductors of the anodes and the grids are likewise parallel connected previous to their connection to the, in reality bevelled, ends of the external tube 41 and internal tube 44, respectively. The junction of the cathode wave conductor on this side is effected by the adjustable resonance choke 93 shown in Figure 13. The voltage supplies are again effected at the free tube ends of the double tuning oscillator. As method of operation this example shows a disdamping connection, a high positive voltage being transmitted to the grid and a somewhat lower positive voltage to the anode. Here the excitation of the oscillation is achieved by the negative resistance in the individual circuits appearing in result of the secondary emission.

Figure 27:
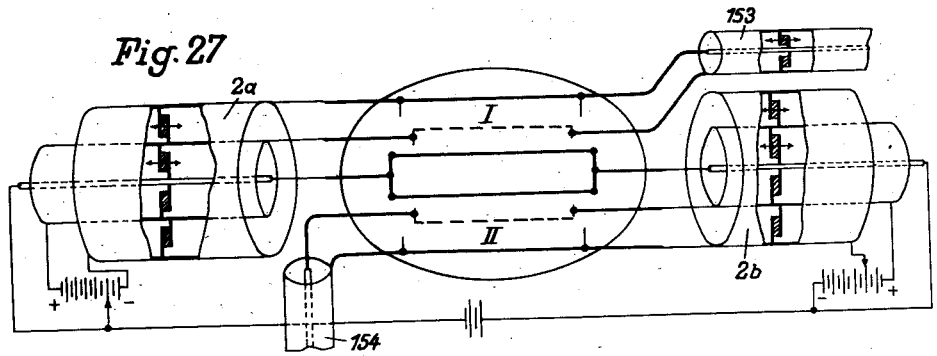

Figure 27 shows the possibilities of junction of single and double-tube resonators to a double transmitter valve. The electrode systems I and II of the transmitter valve are not joined in parallel, but are connected to separate tube systems. Therefore the wave conductors from anode and grid of system I lead to the double tuning resonator $2^a$ and to the single tuning resonator 153 according to Figure 2, while the same electrodes of system II are connected to the multiple resonator $2^b$ and the concentric conduit 154. The concentric conduit 154 serves as energy-supplying conduction to the receiver system. The wave conduction of the cathode circuit is reciprocally tuned against system I and II in the multiple tuning resonators $2^a$ and $2^b$. This arrangement allows for a separate supplying with voltage of both electrode systems of the electron valve, one source of voltage being connected to the resonator $2^a$ and the other one to resonator $2^b$, as shown by Figure 27 for a mixed method of operation, system I with electric brake field connection and system II with undamped connection.

Figure 28:
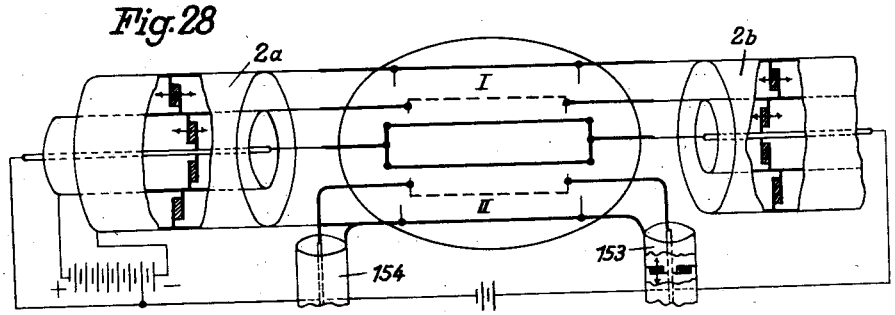

With the transmitter valve one of the electrode systems may be employed as coupling system not supplied with tension. The use of tube resonators for this operating condition is shown in Figure 28. System I is tuned on each side by the double tube resonators $2^a$ and $2^b$ and receives its operating voltages through one of them, while grid and anode of system II are led to the concentric conduits 153 and 154, without however receiving any operating voltage. The concentric tube conduit 154 serves as conductor of energy to the receiver, while the conduit 153, tunable by means of symmetry reflection pistons, causes a one-sided tuning of the coupling system. An appropriate way of arranging the additional tube resonators 153 and 154 of Figures 27 and 28 in combination with the valve connection socket shown in Figure 13, is by arranging them vertically to the multiple tube resonators $2^a$ and $2^b$.

Figure 29:
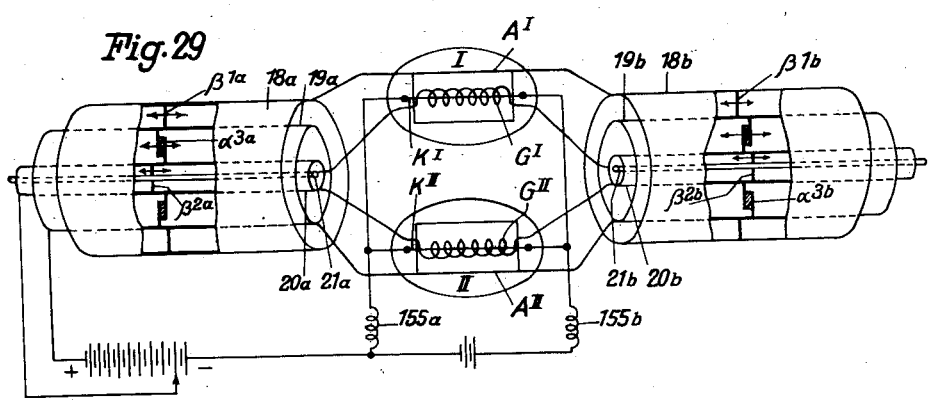

The employment of a multiple tube resonator according to Figure 4 for a push-pull transmitter with double-sided push-pull tuning is shown in Figure 29. The anode push-pull circuit of the electrode transmitter valves I and II is formed by the tubes $18^a$ and $19^a$, $18^b$ and $19^b$ in combination with the shiftable metallic reflection bridges $\beta^{1a}$ and $\beta^{1b}$ by connecting anode $A^I$ of the electron valve I to the external tube $18^a$ and $18^b$, and anode $A^{II}$ of valve II to the first intertubes $19^a$ and $19^b$ of the multiple tuning tube resonators. The grids $G^I$ and $G^{II}$ are combined with the inter- and internal tubes $20^a$, $21^a$, and $20^b$, $21^b$, to form double-sided grid push-pull circuits which are tuned by the metallic reflection bridges $\beta^{2a}$ and $\beta^{2b}$. Between these two circuits a tuning or coupling in the tube conductions formed by the intertubes $19^a$, $20^a$, and $19^b$, $20^b$ is achieved by means of the symmetry reflection pistons $\alpha^{3a}$ and $\alpha^{3b}$. The supply circuits leading to the batteries are again connected to the free tube ends. A tuning of the cathodes $K^I$ and $K^{II}$ is not effected in this arrangement. The heating current is supplied to them through the chokes $155^a$ and $155^b$.

Figure 30:
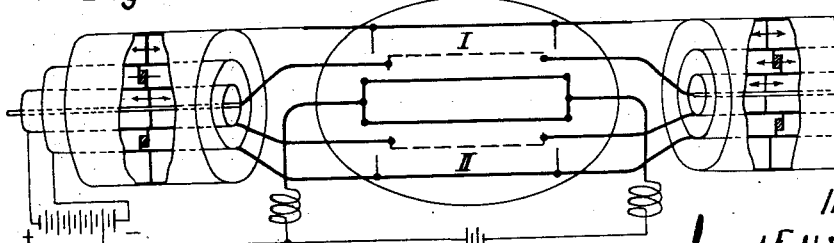

Push-pull oscillations can be produced in one valve, for the tuning of which the above-mentioned resonators can be employed in the same way. Figure 30 shows such a double-sided push-pull tuning of a transmitter valve in connection with the multiple resonators according to Figure 4. The electrodes of the tube systems I and II working in push-pull are connected to the separate tube systems in analogy to the construction of Figure 29; the cathode circuit is connected to the filament battery by way of the chokes. As method of operation the drawing shows a space-charge push-pull oscillation-connection with positive grid and negative biased anode.

Figure 31:
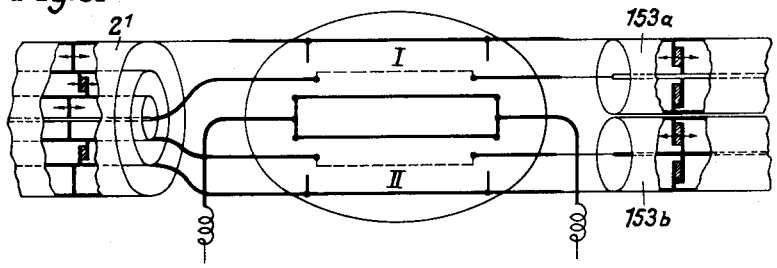

A push-pull tuning arrangement with the same type of valves but different tuning tube resonators is given in Figure 31. A push-pull tuning of the grids and the anodes of system I and II takes place in the multiple tuning resonator $2'$, while in the single tube resonators $153^a$ and $153^b$ the grids and anodes of system I and II are connected to single oscillation circuits.

Figure 32:
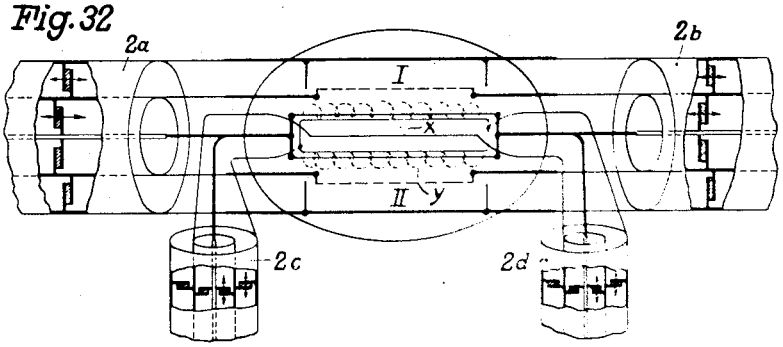

A special type of the transmitter valves possesses a so-called center of symmetry. This is a grid-anode system situated in close proximity to the filaments which serves as oscillation excitation and space-charge impulse control. Its tuning is likewise achieved by means of double tube resonators, as shown in Figure 32. The main systems I and II are tuned by the double tube resonators $2^a$ and $2^b$ as demonstrated in Figures 25, 26; grid $y$ and anode $x$ are connected to the multiple tube resonators $2^c$ and $2^d$ and are tuned here with each other as well as against the cathode circuit which is likewise connected to these resonators. The voltage supply for the electrodes is performed by the free tube ends of one of the two resonators $2^c$ or $2^d$ in the same way as with all the other connections.

Figure 33:
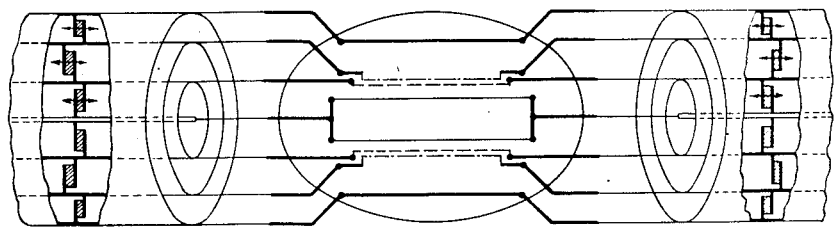

Another mode of application of the multiple tube resonators presents itself on employing the multiple grid transmitter valves. These are electron valves consisting of two electrode systems with several grids symmetrically arranged into a mutual cathode circuit. Figure 33 gives an example of the junction of such a transmitter valve with two double tube resonators which, contrarily to those shown in Figure 4, have symmetry reflection pistons in every concentric tube system, so that each parallel connected pair of electrodes can be supplied with voltage independently from the others. By interchanging the wave conductor connections at the separate tubes of the resonator, the valve electrodes can be connected with other corresponding tubes of the resonator in various combinations to form oscillatory circuits.

Figure 34:
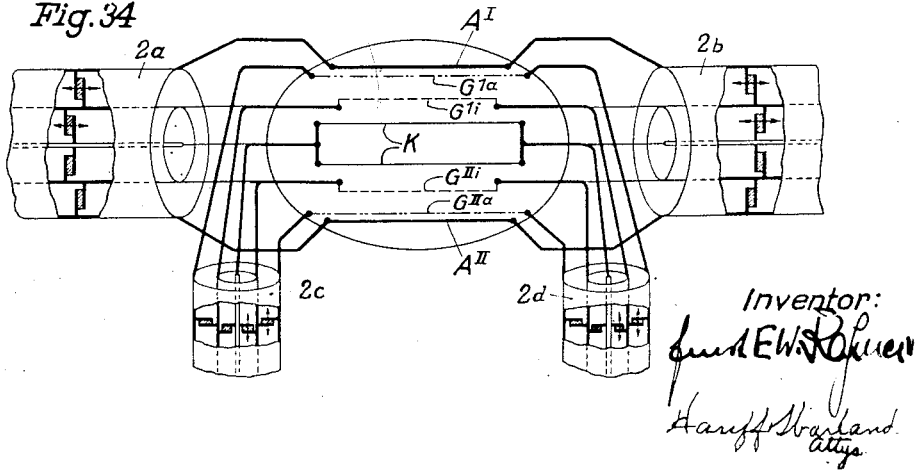

The tuning of individual electrodes can also be achieved separately by means of double resonators, as shown in Figure 34, for the combination of several double tube resonators with a multiple grid transmitter valve.

In the tube resonators $2^a$ and $2^b$ the parallelled anodes $A^I$ and $A^{II}$ and the internal grids $G^{II}$ and $G^{III}$ are gathered into an oscillatory circuit, while in the resonators $2^c$ and $2^d$ the parallel connected external grids $G^{Ia}$ and $G^{IIa}$ are tuned against the parallel connected internal grids $G^{II}$ and $G^{III}$ equally connected to those resonators. The internal tube conductor circuit of all 4 tuning resonators causes the tuning of the cathode circuit K against the internal grids $G^{II}$ and $G^{III}$. By changing the conduit supplies all combinations of oscillatory circuit connections can be carried out, so that for certain phases of oscillation the valve electrodes which are in suitable phase relation to one another can be gathered into separate oscillatory circuits.

Having now particularly described and ascertained the nature of my said invention, and in what manner the same is to be performed, I declare that what I claim is:

1. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors.

2. An ultra-short wave transmitter comprising an electron tube generator, a tube resonator having concentric conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors.

3. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a socket clamped to said tube resonator and having a resilient clip engaging the electron tube generator to mechanically connect the same together.

4. An ultra-short wave transmitter comprising an electron tube generator, a tube resonator having concentric conductors connected at one end to said generator to receive high frequency current therefrom, said end being bevelled to effect uniform transition in impedance and reflecting bridges slidably held in each tube resonator for longitudinal movement therein, each bridge comprising a pair of discs separated by insulation and connected to the respective conductors.

5. An ultra-short wave transmitter comprising an electron tube generator, a tube resonator having concentric conductors connected at one end to said generator to receive high frequency current therefrom, said end being bevelled to effect uniform transition in impedance and reflecting bridges slidably held in each tube resonator for longitudinal movement therein, each bridge comprising a pair of discs separated by insulation and connected to the respective conductors, said bridges having a resilient peripheral portion to improve the contact with the outer conductor.

6. An ultra-short wave transmitter comprising an electron tube generator, a tube resonator having a plurality of concentric tube conductors connected at one end to said generator to receive high frequency current therefrom, said end being bevelled to effect uniform transition in impedance and separate reflecting bridges slidably held in each tube conductor for longitudinal movement therein, each bridge comprising a pair of electrodes separated by insulation and connected to the respective conductors.

7. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a radiating system connected to said conductors.

8. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a radiating system comprising an extensible rod connected to one of said conductors.

9. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a radiating system comprising a pair of telescoping members, each connected to one of said conductors.

10. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a radiating system comprising flexible metal strips adjustable as to effective length, said strips being connected to the respective conductors.

11. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a radiating system comprising flexible metal strips, said strips having a curved cross section whereby rigidity is imparted thereto.

12. An ultra-short wave transmitter comprising an electron tube generator, a tube resonator having conductors connected at one end to said generator to receive high frequency current therefrom, said end being bevelled to effect uniform transition in impedance, and reflecting bridges slidably held in each tube resonator for longitudinal movement therein, each bridge comprising a pair of electrodes separated by insulation and connected to the respective conductors and a radiating system comprising flexible metal strips adjustable as to effective length, said strips being connected to the respective conductors and friction rollers to adjust the effective length of said strips.

ERNST EDUARD WILHELM KASSNER.